United States Patent
Cho et al.

(10) Patent No.: US 12,128,736 B2
(45) Date of Patent: Oct. 29, 2024

(54) HEAT PUMP SYSTEM FOR VEHICLE

(71) Applicants: Hyundai Motor Company, Seoul (KR); Kia Corporation, Seoul (KR)

(72) Inventors: Wan Je Cho, Hwaseong-Si (KR); Dong Seok Oh, Hwaseong-Si (KR); Namho Park, Suwon-Si (KR); Seung Ho Lee, Seoul (KR); Seong-Bin Jeong, Hwaseong-Si (KR); Tae Hee Kim, Ansan-Si (KR); Jae-Eun Jeong, Hwaseong-Si (KR); Jeawan Kim, Hwaseong-Si (KR); Hyunjae Lee, Seongnam-Si (KR); Man Hee Park, Suwon-Si (KR); Jae Yeon Kim, Hwaseong-Si (KR); Yeonho Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 222 days.

(21) Appl. No.: 17/883,327

(22) Filed: Aug. 8, 2022

(65) Prior Publication Data

US 2023/0173882 A1 Jun. 8, 2023

(30) Foreign Application Priority Data

Dec. 8, 2021 (KR) ........................ 10-2021-0174825

(51) Int. Cl.
*B60H 1/00* (2006.01)
(52) U.S. Cl.
CPC ..... *B60H 1/00885* (2013.01); *B60H 1/00278* (2013.01); *B60H 2001/00307* (2013.01)

(58) Field of Classification Search
CPC ............ B60H 1/00885; B60H 1/00278; B60H 1/00899; B60H 1/32284; B60H 2001/00307; B60H 2001/00923
See application file for complete search history.

(56) References Cited

U.S. PATENT DOCUMENTS

| 7,789,176 | B2 | 9/2010 | Zhou |
| 11,959,668 | B2* | 4/2024 | Lee ........................ B60H 1/034 |
| 2018/0178615 | A1 | 6/2018 | Xia et al. |
| 2021/0384572 | A1* | 12/2021 | Lee ........................ F25B 40/00 |
| 2022/0281285 | A1* | 9/2022 | Kim ................... B60H 1/00392 |
| 2022/0349627 | A1* | 11/2022 | Lee .................... B60H 1/32284 |
| 2023/0173881 | A1* | 6/2023 | Jeong ................. B60H 1/00278 62/247 |
| 2023/0173883 | A1* | 6/2023 | Jeong ................. B60H 1/00278 62/159 |

(Continued)

FOREIGN PATENT DOCUMENTS

| KR | 10-1457916 B1 | 10/2014 |
| KR | 10-2097394 B1 | 3/2020 |

*Primary Examiner* — Marc E Norman
(74) *Attorney, Agent, or Firm* — Morgan, Lewis & Bockius LLP

(57) ABSTRACT

A heat pump system for a vehicle includes a valve, an electrical component cooling device, a battery cooling device, an indoor heating device, an indoor cooling device, a centralized energy device, and a chiller to improve heating efficiency by regulating a temperature of a battery module by use of one chiller in which a cooler and a refrigerant exchange heat, recovers various heat sources in a heating mode of the vehicle and utilizes the recovered heat sources for indoor heating.

17 Claims, 7 Drawing Sheets

(56) References Cited

U.S. PATENT DOCUMENTS

| | | | | |
|---|---|---|---|---|
| 2023/0173884 A1* | 6/2023 | Jeong | ................ | B60H 1/32284 |
| | | | | 165/160 |
| 2023/0415547 A1* | 12/2023 | Tanabe | ................ | B60H 1/3205 |
| 2024/0034129 A1* | 2/2024 | Kim | ................ | B60H 1/00899 |

* cited by examiner

100

HEAT PUMP SYSTEM FOR VEHICLE

CROSS-REFERENCE TO RELATED APPLICATION

The present application claims priority to Korean Patent Application No. 10-2021-0174825 filed on Dec. 8, 2021, the entire contents of which is incorporated herein for all purposes by this reference.

BACKGROUND OF THE PRESENT DISCLOSURE

Field of the Present Disclosure

The present disclosure relates to a heat pump system for a vehicle. More particularly, the present disclosure relates to a heat pump system for a vehicle by selectively using a chiller in which a refrigerant and a coolant exchange heat with each other to regulate a temperature of a battery module, and selectively using a high-temperature coolant and a low-temperature coolant, respectively, to cool or heat an interior of the vehicle.

Description of Related Art

Generally, an air conditioning system for a vehicle includes an air conditioner unit circulating a refrigerant to heat or cool an interior of the vehicle.

The air conditioner unit, which is to maintain the interior of the vehicle at an appropriate temperature regardless of a change in an external temperature to maintain a comfortable internal environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Meanwhile, recently, in accordance with a continuous increase in an interest in energy efficiency and an environmental pollution problem, the development of an environment-friendly vehicle capable of substantially substituting for an internal combustion engine vehicle is required, and the environment-friendly vehicle is classified into an electric vehicle driven using a fuel cell or electricity as a power source and a hybrid vehicle driven using an engine and a battery.

In the electric vehicle or the hybrid vehicle among these environment-friendly vehicles, a separate heater is not used unlike an air conditioner of a general vehicle, and an air conditioner used in the environment-friendly vehicle is generally known as a heat pump system.

Meanwhile, the electric vehicle generates driving force by converting chemical reaction energy between oxygen and hydrogen into electrical energy. In the present process, thermal energy is generated by a chemical reaction in a fuel cell. Therefore, it is necessary in securing performance of the fuel cell to effectively remove generated heat.

Furthermore, the hybrid vehicle generates driving force by driving a motor using electricity supplied from the fuel cell described above or an electrical battery, together with an engine operated by a general fuel. Therefore, heat generated from the fuel cell or the battery and the motor may be effectively removed to secure performance of the motor.

Therefore, in the hybrid vehicle or the electric vehicle according to the related art, cooling means, a heat pump system, and a battery cooling system, respectively, may be configured as separate closed circuits to prevent heat generation in the motor, an electric component, and the battery including a fuel cell.

Therefore, a size and a weight of a cooling module provided at the front of the vehicle are increased, and a layout of connection pipes supplying a refrigerant and a coolant to each of the heat pump system, the cooling means, and the battery cooling system in an engine compartment becomes complicated.

Furthermore, because the battery cooling system heating up or cooling the battery according to a state of the vehicle is separately provided so that the battery exhibits optimal performance, a plurality of valves for connecting the respective connection pipes to each other are used, and noise and vibrations due to frequency opening or closing operation of these valves are transferred to the interior of the vehicle so that a ride comfort deteriorates.

Furthermore, when heating the interior of the vehicle, there are disadvantages of decreasing heating performance due to a lack of a heat source, increasing electricity consumption due to the use of an electric heater, increasing power consumption of the compressor, and the like.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a heat pump system for a vehicle configured for improving heating efficiency by use of one chiller in which a coolant and a refrigerant exchange heat with each other to regulate a temperature of a battery module, and by recovering various heat sources in a heating mode of the vehicle and using the recovered heat sources for indoor heating.

Various aspects of the present disclosure are directed to providing a heat pump system for a vehicle, including: an electrical component cooling device that includes a radiator and a first pump provided on a first line and configured to circulate a coolant to the first line to cool at least one electrical component provided on the first line; a battery cooling device that includes a second pump and a battery module provided on a second line, and configured to circulate the coolant to the battery module; an indoor heating device that includes a third pump and a heater provided on a third line to heat an interior of the vehicle using a high-temperature coolant; an indoor cooling device that includes a fourth pump and a cooler interconnected through a fourth line to cool the interior of the vehicle using a low-temperature coolant; a centralized energy (CE) device that is configured to regulate the temperature of the coolant by exchanging heat between thermal energy generated during condensation and evaporation of a refrigerant circulated on a refrigerant line and the introduced coolant to supply the high-temperature coolant to the indoor heating device and supply the low-temperature coolant to the indoor cooling device; and a chiller which is connected to a refrigerant connection line connected to the refrigerant line, is provided on a fifth line connected to the first line and the second line through first and second valves, respectively, and is configured to control a temperature of the coolant by heat-exchanging a selectively introduced coolant with the refrigerant.

The centralized energy device may include: a condenser that condenses the refrigerant by exchanging heat between the refrigerant and the coolant; a first expansion valve which is connected to the condenser and the refrigerant line; an evaporator which is connected to the first expansion valve through the refrigerant line, connected to the fourth line, and is configured to lower the temperature of the coolant while evaporating the refrigerant through heat exchange between the refrigerant and the coolant; a compressor which is provided on the refrigerant line between the evaporator and the condenser; and an accumulator which is provided on the refrigerant line between the evaporator and the compressor, in which a first end portion of the refrigerant connection line may be connected to the refrigerant line connecting the condenser and the first expansion valve, and a second end portion of the refrigerant connection line may be connected to the refrigerant line between the evaporator and the accumulator.

The condenser may be provided on a sixth line whose a first end portion is connected to the second valve, the first line may be connected to the sixth line through a third valve provided on the first line between the at least one electrical component and the first valve, a first end portion of the third line may be connected to a fourth valve provided on the sixth line, a second end portion of the third line may be connected to the sixth line, and the first line connected to the radiator may be connected to the fourth valve through a radiator connection line.

The heat pump system may further include: a bypass line that selectively connects the first line connected to the first pump to a fifth valve provided on the first line at a front of the radiator based on a flow direction of the coolant so that the coolant passing through the at least one electrical component is circulated back to the at least one electrical component by bypassing the radiator; a supply line that has a first end portion connected to the third line and a second end portion connected to the second line through a sixth valve; a seventh valve which is provided on the supply line; an eighth valve that selectively connects the fifth line connected to a rear end portion of the chiller and the first line based on the flow direction of the coolant; a first branch line that connects the first valve and the sixth valve; and a second branch line that connects the seventh valve and the eighth valve.

When cooling the battery module in a cooling mode of the vehicle, in the electrical component cooling device, the first pump may operate, the first line connected to the first valve may be closed and the first line connected to the sixth line may be opened, by operation of the third valve, the sixth line and the radiator connection line may be connected by operation of the fourth valve, the coolant may be circulated to the radiator, the at least one electrical component, and the condenser along the open first line, a portion of the sixth line, and the radiator connection line, in the battery cooling device, the second pump may operate, the second line and the fifth line may be connected and a portion of the sixth line connected to the second valve may be closed, by operation of the second valve, the first branch line may be closed by operation of the first valve and the sixth valve, the second branch line may be opened by operation of the seventh valve and the eighth valve, the second line connected to the second pump may be opened by operation of the sixth valve and the seventh valve, the coolant passing through the battery module may pass through the chiller along the fifth line from the second line, and may then be circulated along the opened second line, fifth line, and second branch line while being introduced back into the second line through the second branch line, in the centralized energy device, each component may operate to circulate the refrigerant along the refrigerant line, and in the indoor cooling device, the fourth pump may operate so that the coolant is circulated along the fourth line connecting the evaporator and the cooler to supply the coolant passing through the evaporator provided in the centralized energy device to the cooler.

When cooling the at least one electrical component and the battery module using the coolant cooled in the radiator in the cooling mode of the vehicle, in the electrical component cooling device and the battery cooling device, the first and second pumps may operate, respectively, the first line connected to the first valve may be opened by operation of the first valve and the third valve, the first branch line may be opened while the fifth line is closed by operation of the first valve, the second line connected to the battery module may be opened and the supply line is closed, by operation of the sixth valve, the sixth line may be opened while the fifth line is closed by operation of the second valve, the radiator connection line may be connected to the first line connected to the radiator while the third line is closed by operation of the fourth valve, the coolant cooled in the radiator may be introduced into the radiator by sequentially passing through the at least one electrical component, the battery module, and the condenser along the opened first line, first branch line, second line, sixth line, and radiator connection line, in the centralized energy device, each component may operate to circulate the refrigerant along the refrigerant line, and in the indoor cooling device, the fourth pump may operate so that the coolant is circulated along the fourth line connecting the evaporator and the cooler to supply the coolant passing through the evaporator provided in the centralized energy device to the cooler.

When recovering an external heat source and increasing the temperature of the battery module in a heating mode of the vehicle, in the electrical component cooling device and the battery cooling device, the first and second pumps may operate, respectively, the third pump may operate in the indoor heating device, the first line may be connected to the fifth line and the first branch line may be closed, by operation of the first valve, the first line connected to the first valve may be opened and a portion of the first line connected to the sixth line may be closed, by operation of the third valve, the first line connected to the radiator may be opened while the bypass line is closed by operation of the fifth valve, the fifth line may be connected to the first line by operation of the eighth valve, the coolant passing through the at least one electrical component may pass through the chiller along the opened first line and the fifth line, and then recover a heat source from outside air while passing through the radiator along the first line opened again, the fifth line connected to the second valve may be closed and the second line may be connected to the sixth line through the second valve, by operation of the second valve, the third line may be opened while the radiator connection line is closed by operation of the fourth valve, the supply line and the second line may be connected by operation of the sixth valve, the second branch line may be closed by operation of the seventh valve, the coolant passing through the battery module may pass through the condenser along the opened second line and sixth line, and may then be supplied to the heater along the opened third line, the coolant passing through the heater may be introduced back into the condenser along the third line and the sixth line, some of the coolant passing through the condenser may be circulated while being introduced back into the battery module along the opened supply line and second line, and in the centralized energy device, each component may operate so that the refrigerant is circulated along the refrigerant line.

When recovering waste heat of the at least one electrical component and increasing the temperature of the battery module in the heating mode of the vehicle, in the electrical component cooling device and the battery cooling device, the first and second pumps may operate, respectively, the third pump may operate in the indoor heating device, the first line may be connected to the fifth line and the first branch line may be closed, by operation of the first valve, the first line connected to the first valve may be opened and a portion of the first line connected to the sixth line may be closed, by operation of the third valve, the bypass line may be opened while the first line connected to the radiator is closed by operation of the fifth valve, the fifth line may be connected to the first line by operation of the eighth valve, as the coolant passing through the at least one electrical component passes through the chiller along the opened first line and fifth line, and then passes through the at least one electrical component along the opened bypass line without passing through the radiator, the temperature of the coolant may increase by the waste heat of the at least one electrical component, the fifth line connected to the second valve may be closed and the second line may be connected to the sixth line through the second valve, by operation of the second valve, the third line may be opened while the radiator connection line is closed by operation of the fourth valve, the supply line and the second line may be connected by operation of the sixth valve, the second branch line may be closed by operation of the seventh valve, the coolant passing through the battery module may pass through the condenser along the opened second line and sixth line, and may then be supplied to the heater along the opened third line, the coolant passing through the heater may be introduced back into the condenser along the third line and the sixth line, some of the coolant passing through the condenser may be circulated while being introduced back into the battery module along the opened supply line and second line, and in the centralized energy device, each component may operate so that the refrigerant is circulated along the refrigerant line.

The chiller may heat the coolant and the refrigerant to recover the waste heat from the coolant whose temperature increases while passing through the at least one electrical component to increase the temperature of the refrigerant.

When recovering an external heat source and recovering waste heat of the battery module in the heating mode of the vehicle, in the electrical component cooling device and the battery cooling device, the first and second pumps may operate, respectively, the third pump may operate in the indoor heating device, the fifth line connected to the first line may be closed and the first branch line may be opened, by operation of the first valve, the second line is connected to the fifth line and a portion of the sixth line connected to the second line may be closed, by operation of the second valve, the first line connected to the radiator may be opened while the bypass line is closed by operation of the fifth valve, the first branch line may be connected to the second line by operation of the sixth valve, the supply line and the second branch line may be closed by operation of the seventh valve, the fifth line may be connected to the first line by operation of the eighth valve, as the coolant passing through the at least one electrical component sequentially passes through the battery module and the chiller along the opened first line, first branch line, second line, and the fifth line and then passes through the radiator along the first line opened again, a heat source may be recovered from outside air, the third line may be opened while the radiator connection line is closed by operation of the fourth valve, the coolant passing through the condenser along the opened sixth line may be supplied to the heater along the third line, the coolant passing through the heater may be circulated while being introduced back into the condenser along the third line and the opened sixth line, and in the centralized energy device, each component operates so that the refrigerant may be circulated along the refrigerant line.

When waste heat of the at least one electrical component and the battery module is recovered in a heating mode of the vehicle, in the electrical component cooling device and the battery cooling device, the first and second pumps may operate, respectively, the third pump may operate in the indoor heating device, the fifth line connected to the first line may be closed and the first branch line may be opened, by operation of the first valve, the second line may be connected to the fifth line and a portion of the sixth line connected to the second line may be closed, by operation of the second valve, the bypass line may be opened while the first line connected to the radiator is closed by operation of the fifth valve, the first branch line may be connected to the second line by operation of the sixth valve, the supply line and the second branch line may be closed by operation of the seventh valve, the fifth line may be connected to the first line by operation of the eighth valve, as the coolant passing through the at least one electrical component passes through the chiller along the opened first line, first branch line, second line, and fifth line, and then passes through the at least one electrical component and the battery module along the opened bypass line without passing through the radiator, the temperature of the coolant may increase by waste heat of the at least one electrical component and the battery module, the third line may be opened while the radiator connection line is closed by operation of the fourth valve, the coolant passing through the condenser along the opened sixth line may be supplied to the heater along the third line, the coolant passing through the heater may be circulated while being introduced back into the condenser along the third line and the opened sixth line, and in the centralized energy device, each component may operate so that the refrigerant is circulated along the refrigerant line.

At a front end portion of the chiller, the refrigerant connection line may be provided with a second expansion valve to control the flow of the refrigerant introduced into the chiller and selectively expand the refrigerant.

The second expansion valve may expand the refrigerant introduced into the refrigerant connection line and introduce the refrigerant into the chiller, when the battery module is cooled using the coolant heat-exchanged with the refrigerant, or when waste heat is selectively recovered from the at least one electrical component and the battery module.

The first expansion valve and the second expansion valve may be an electronic expansion valve that selectively expands the refrigerant while controlling the flow of the refrigerant.

When dehumidification is required in a heating mode of the vehicle, the fourth pump provided in the indoor cooling device may operate, and the refrigerant may be supplied to an evaporator provided in the centralized energy device.

The indoor heating device may further include a coolant heater provided on the third line between the third valve and the third pump.

In the heating mode of the vehicle, the coolant heater may operate when the temperature of the coolant supplied to the heater is lower than a target temperature or when the temperature of the battery module increases.

The chiller may recover waste heat generated from the at least one electrical component or the battery module or regulate the temperature of the battery module according to a cooling mode or a heating mode of the vehicle.

As described above, according to the heat pump system for a vehicle according to various exemplary embodiments of the present disclosure, it is possible to simplify a system by use of one chiller in which a coolant and a refrigerant exchange heat with each other in an electric vehicle to regulate a temperature of a battery module according to a mode of the vehicle.

Furthermore, according to various exemplary embodiments of the present disclosure, it is possible to improve heating efficiency by selectively recovering waste heat generated from an external heat source, an electrical component, or a battery module in a heating mode of a vehicle and using the recovered waste heat for indoor heating.

Furthermore, according to various exemplary embodiments of the present disclosure, it is possible to simplify the system and simplify the layout of the connection pipe through which the refrigerant is circulated by selectively exchanging heat between thermal energy generated from the refrigerant and the coolant during the condensation and evaporation of the refrigerant, and controlling the indoor temperature of the vehicle using the heat-exchanged low-temperature or high-temperature coolant, respectively.

Furthermore, according to various exemplary embodiments of the present disclosure, it is possible to increase an entire travel distance of a vehicle by efficiently controlling a temperature of a battery module to exhibit optimal performance of the battery module and effectively managing the battery module to increase the entire travel distance of the vehicle.

Furthermore, according to various exemplary embodiments of the present disclosure, it is possible to modularize a centralized energy device that generates thermal energy through condensation and evaporation of a refrigerant, and reduce a size and weight and prevent the occurrence of noise, vibration, and operational instability compared to the conventional air conditioner means by use of a high-performance refrigerant.

Furthermore, according to various exemplary embodiments of the present disclosure, it is possible to reduce cost and a weight by use of a coolant heater applied to an indoor heating device configured for assisting the indoor heating.

Furthermore, according to various exemplary embodiments of the present disclosure, it is possible to reduce the manufacturing cost, reduce the weight, and improve the space utilization by simplifying the entire system.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
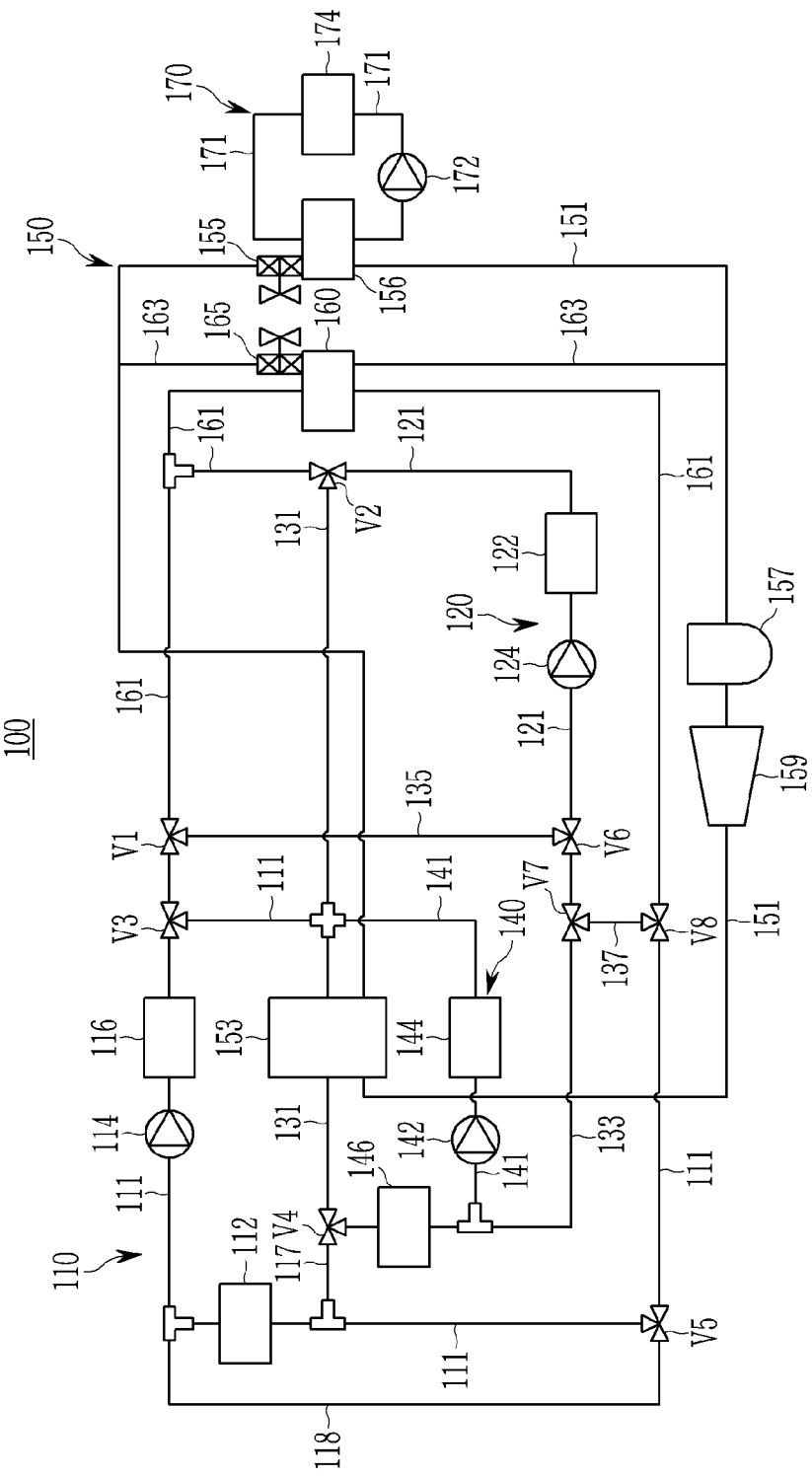
FIG. 1 is a block diagram of a heat pump system for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments of the present disclosure will hereinafter be described in detail with reference to the accompanying drawings.

Because exemplary embodiments stated in the exemplary embodiment and configurations shown in the accompanying drawings are only exemplary embodiments of the present disclosure and do not represent the spirit of the present disclosure, it is to be understood that various equivalents and modifications which may replace exemplary embodiments stated in the exemplary embodiment and configurations shown in the accompanying drawings in a point in time at which an exemplary embodiment of the present disclosure is filed.

A description for contents that are not associated with the present disclosure will be omitted to clearly describe the present disclosure, and like reference numerals designate like elements throughout the specification.

Because sizes and thicknesses of the respective components were arbitrarily shown in the accompanying drawings for convenience of explanation, the present disclosure is not limited to contents shown in the accompanying drawings. Furthermore, thicknesses were exaggerated to obviously represent several portions and regions.

Furthermore, throughout the specification, unless explicitly described to the contrary, the word "comprise" and variations such as "comprises" or "comprising", will be understood to imply the inclusion of stated elements but not the exclusion of any other elements.

Furthermore, the terms "~unit", "~means", "~part", and "~member" described in the specification mean units of a comprehensive configuration for performing at least one function and operation.

FIG. 1 is a block diagram of a heat pump system for a vehicle according to various exemplary embodiments of the present disclosure.

According to various exemplary embodiments of the present disclosure, a heat pump system 100 for a vehicle selectively utilizes a chiller 160 in which a refrigerant and a coolant exchange heat with each other to regulate a temperature of a battery module 122, and selectively utilizes a high-temperature coolant and a low-temperature coolant, respectively, to cool or heat an interior of the vehicle.

Referring to FIG. 1, the heat pump system 100 for a vehicle according to various exemplary embodiments of the present disclosure includes an electrical component cooling device 110, a battery cooling device 120, an indoor heating device 140, an indoor cooling device 170, a centralized energy device 150 (hereinafter, referred to as a CE device), and the chiller 160.

First, the electrical component cooling device 110 includes a radiator 112 and a first water pump 114 provided on a first line 111.

The radiator 112 is provided at the front of the vehicle, and a cooling fan is provided at the rear of the vehicle to cool a coolant by exchanging heat between the cooling fan and outside air.

The electrical component cooling device 110 may circulate coolant on the first line 111 by operation of the first water pump 114 to cool at least one electrical component 116 provided on the first line 111.

Here, the electrical component 116 may include any one of a driving motor, a power control device, an inverter, an on board charger (OBC), a controller, or an autonomous driving controller.

The driving motor, the power control device, the inverter, the controller, and the autonomous driving controller may generate heat while driving, and the charger may generate heat when charging the battery module 122.

The electrical component cooling device 110 configured in the instant way circulates the coolant cooled in the radiator 112 by operation of the first water pump 114 along the first line 111, cooling the electrical component 116 to prevent the electrical component 116 from overheating.

In the exemplary embodiment of the present disclosure, the battery cooling device 120 may include the battery module 122 and the second water pump 124 provided on the second line 121.

The battery cooling device 120 configured in the instant way may regulate the temperature of the battery module 122 by circulating the coolant to the battery module 122 by operation of the second water pump 124.

In the exemplary embodiment of the present disclosure, the indoor heating device 140 may include a third water pump 142 and a heater 144 provided on a third line 141 to heat an interior of the vehicle using a high-temperature coolant.

When the indoor heating device 140 configured in the instant way heats the interior of the vehicle, the high-temperature coolant may be circulated on the third line 141 by operation of the third water pump 142 so that the high-temperature coolant is supplied to the heater 144.

Accordingly, the high-temperature coolant may be supplied to the heater 144 along the third line 141.

That is, in a heating mode of the vehicle, the indoor heating device 140 may heat the interior of the vehicle by supplying the high-temperature coolant to the heater 144 by operation of the third water pump 142.

Meanwhile, the heater 144 may be provided inside a heating, ventilation, and air conditioning (HVAC) module.

Here, the third line 141 between a fourth valve V4 and the third water pump 142 to be described later may be provided with a coolant heater 146 for selectively heating the coolant circulated on the third line 141.

In the heating mode of the vehicle, the coolant heater 146 is turned on when the temperature of the coolant supplied to the heater 144 is lower than a target temperature to heat the coolant circulated on the third line 141, introducing the coolant having an increased temperature into the heater 144.

Furthermore, the coolant heater 146 may selectively operate even when increasing the temperature of the battery module 122.

The coolant heater 146 may be an electric heater that operates according to the supply of power.

Meanwhile, although the exemplary embodiment has been referred to as an example that the coolant heater 146 is provided on the third line 141, the exemplary embodiment of the present disclosure is not limited thereto, and instead of the coolant heater 146, an air heater may be applied to increase the temperature of the outside air introduced into the interior of the vehicle.

The air heater may be provided at the rear of the heater 144 from the inside of the HVAC module toward the interior of the vehicle to selectively heat the outside air passing through the heater 144.

The indoor heating device 140 configured in the instant way may supply the high-temperature coolant to the heater 144 by operation of the third water pump 142 in the heating mode of the vehicle, heating the interior of the vehicle.

In the exemplary embodiment of the present disclosure, the indoor cooling device 170 may include a fourth water pump 172 and a cooler 174 interconnected through a fourth line 171 to cool the interior of the vehicle using a low-temperature coolant.

The fourth line 171 may be connected to an evaporator 156 provided in the centralized energy device 150.

The indoor cooling device 170 supplies the coolant whose temperature is lowered while being circulated on the fourth line 171 to the cooler 174 by operation of the fourth water pump 172 in the cooling mode of the vehicle, cooling the interior of the vehicle.

Here, the cooler 174 may be provided inside the HVAC module.

Meanwhile, the HVAC module is provided between the heater 144 and the cooler 174, and includes an opening/ closing door for controlling the outside air passing through the cooler 174 to be selectively introduced into the heater 144 according to the cooling, heating, and dehumidifying modes of the vehicle.

That is, in the heating mode of the vehicle, the opening or closing door is opened so that the external air passing through the cooler 174 is introduced into the heater 144. On the other hand, in the cooling mode of the vehicle, the opening or closing door closes the heater 144 side so that the outside air cooled while passing through the cooler 174 is directly introduced into the interior of the vehicle.

In the exemplary embodiment of the present disclosure, the centralized energy device (hereinafter, referred to as a CE device) 150 may be connected to the indoor heating device 140 and connected to the fourth line 171 to supply a high-temperature coolant to the indoor heating device 140, and supply a low-temperature coolant to the indoor cooling device 170.

The CE device 150 may exchange heat between energy generated during condensation and evaporation of a refrigerant circulated on the refrigerant line 151 and each supplied coolant.

The refrigerant may be a high-performance R152-a, R744, or R290 refrigerant.

That is, the high-temperature coolant is supplied to the heater 144 through the third line 141, and the low-temperature coolant is supplied to the cooler 174 through the fourth line 171.

Here, the CE device 150 includes a condenser 153 connected through the refrigerant line 151, a first expansion valve 155, an evaporator 156, an accumulator 157, and a compressor 159.

First, the condenser 153 circulates a refrigerant therein, and may be provided on a sixth line 131 which is selectively connectable to the first line 111 or the second line 121.

That is, the condenser 153 may condense the refrigerant by exchanging heat between the refrigerant and the coolant introduced through the sixth line 131.

The first expansion valve 155 may be connected to the condenser 153 through the refrigerant line 151. The first expansion valve 155 receives the refrigerant passing through the condenser 153 and expands the refrigerant.

The evaporator 156 is connected to the first expansion valve 155 through the refrigerant line 151. The evaporator 156 may be connected to the fourth line 171 to cool the coolant circulated on the fourth line 171 in the indoor cooling device 170.

The evaporator 156 configured in the instant way may lower the temperature of the coolant while evaporating a refrigerant by exchanging heat between the refrigerant and the coolant.

Here, the coolant circulated to the indoor cooling device 170 may be supplied to the evaporator 156 along the fourth line 171 so that the evaporator 156 evaporates a refrigerant by exchanging heat with the coolant.

Accordingly, in the cooling mode of the vehicle, the evaporator 156 may cool the coolant circulated on the fourth line 171 by exchanging heat with the low-temperature refrigerant evaporated inside, and may supply the low-temperature coolant to the cooler 174 through the fourth line 171.

Furthermore, the compressor 159 is provided on the refrigerant line 151 between the evaporator 156 and the condenser 153. The compressor 159 may compress a gaseous refrigerant discharged from the evaporator 156, and supply the compressed refrigerant to the condenser 153.

Meanwhile, the accumulator 157 is provided on the refrigerant line 151 between the evaporator 156 and the compressor 159.

The accumulator 157 supplies only the gaseous refrigerant to the compressor 159 to improve efficiency and durability of the compressor 159.

The chiller 160 is connected to the centralized energy device 150 through the refrigerant connection line 163 so that the refrigerant is selectively circulated.

Furthermore, the chiller 160 may be provided on the fifth line 161 connected to the first line and the second line 111 and 121 through the first valve V1 and the second valve V2, respectively.

Accordingly, the chiller 160 may selectively exchange heat between the introduced coolant and the refrigerant to regulate the temperature of the coolant.

That is, the chiller 160 may recover waste heat generated from the electrical component 116 or the battery module 122 or regulate the temperature of the battery module 122 according to a cooling mode or a heating mode of the vehicle.

Meanwhile, a first end portion of the refrigerant connection line 163 may be connected to the refrigerant line 151 connecting the condenser 153 and the first expansion valve 155.

Furthermore, a second end portion of the refrigerant connection line 163 may be connected to the refrigerant line 151 between the evaporator 156 and the accumulator 157.

Here, at a front end portion of the chiller 160, the refrigerant connection line 163 may be provided with a second expansion valve 165 to control the flow of the refrigerant introduced into the chiller 160 and selectively expand the refrigerant.

The second expansion valve 165 may expand the refrigerant introduced into the refrigerant connection line 163 and introduce the refrigerant into the chiller 160, when the battery module 122 is cooled using the coolant heat-exchanged with the refrigerant, or when waste heat is selectively recovered from the electrical component 116 and the battery module 122.

The second expansion valve 165 expands the condensed refrigerant discharged from the condenser 153 and introduces the expanded refrigerant into the chiller 160 while the temperature is lowered, further lowering the temperature of the coolant passing through the inside of the chiller 160.

That is, when cooling the battery module 122 using the coolant heat-exchanged with the refrigerant, the chiller 160 lowers the temperature of the coolant passing through the inside of the chiller 160 using the supplied low-temperature refrigerant.

Accordingly, the coolant whose temperature is lowered while passing through the chiller 160 is introduced into the battery module 122, and thus, the battery module 122 may be cooled more efficiently.

Meanwhile, when dehumidification is required in the heating mode of the vehicle, the fourth water pump 172 provided in the indoor cooling device 170 operates, and the refrigerant expanded by operation of the first expansion valve 155 may be supplied to the evaporator 156.

Accordingly, the cooler 174 is supplied with the low-temperature coolant heat-exchanged with the refrigerant in the evaporator 156, so that the indoor dehumidification may be performed.

In the CE device 150 configured in the present way, the condenser 153, the evaporator 156, and the chiller 160 may be a water-cooled heat exchanger into which a coolant is introduced.

Furthermore, the first expansion valve 155 and the second expansion valve 165 may be an electronic expansion valve that selectively expands the refrigerant while controlling the flow of the refrigerant.

Meanwhile, in the exemplary embodiment of the present disclosure, the condenser 153 may be provided on the sixth line 131 including a first end portion connected to the second valve V2.

Furthermore, the first line 111 may be selectively connectable to the sixth line 131 through the third valve V3 provided on the first line 111 between the electrical component 116 and the first valve V1.

In the exemplary embodiment of the present disclosure, a first end portion of the third line 141 may be connected to the fourth valve V4 provided on the sixth line 131. Furthermore, a second end portion of the third line 141 may be connected to the sixth line 131.

Accordingly, the coolant may be introduced into the third line 141 by operation of the fourth valve V4 in the heating mode of the vehicle.

Furthermore, the first line 111 connected to the radiator 112 may be connected to the fourth valve V4 through a radiator connection line 117.

Meanwhile, the heat pump system 100 may further include a bypass line 118, a supply line 133, a seventh valve V7, an eighth valve V8, a first branch line 135, and a second branch line 137. First, the bypass line 118 may be selectively connectable to the first line 111 connected to the first water pump 114 through the fifth valve V5 provided on the first line 111 at the front end portion of the radiator 112 based on the flow direction of the coolant so that the coolant passing through the electrical component 116 is circulated back to the electrical component 116 without passing through the radiator 112.

That is, the bypass line 118 may be selectively opened by operation of the fifth valve V5 when the temperature of the coolant increases by absorbing the waste heat generated from the electrical component 116.

A first end portion of the supply line 133 is connected to a first end portion of the third line 141. A second end portion of the supply line 133 may be connected to the second line 121 through a sixth valve V6.

The seventh valve V7 may be provided on the supply line 133. Furthermore, the eighth valve V8 may selectively connect the fifth line 161 and the first line 111 connected to a rear end portion of the chiller 160 based on the flow direction of the coolant.

In the exemplary embodiment of the present disclosure, the first branch line 135 may connect the first valve V1 and the sixth valve V6. The second branch line 137 may connect the seventh valve V7 and the eighth valve V8.

The first and second branch lines 135 and 137 may be selectively opened or closed by operation of the first, sixth, seventh, and eighth valves V1, V6, V7, and V8 according to the cooling mode or heating mode of the vehicle.

Here, the first to eighth valves V1, V2, V3, V4, V5, V6, V7, and V8 may be three-way valves.

Hereinafter, operations and actions of a heat pump system for a vehicle according to various exemplary embodiments of the present disclosure configured as described above will be described in detail with reference to FIG. 2, FIG. 3, FIG. 4, FIG. 5, FIG. 6, and FIG. 7.

First, an operation when the battery module is cooled according to a cooling mode of a vehicle in the heat pump system for a vehicle according to the exemplary embodiment of the present disclosure will be described with reference to FIG. 2.

Figure 2:
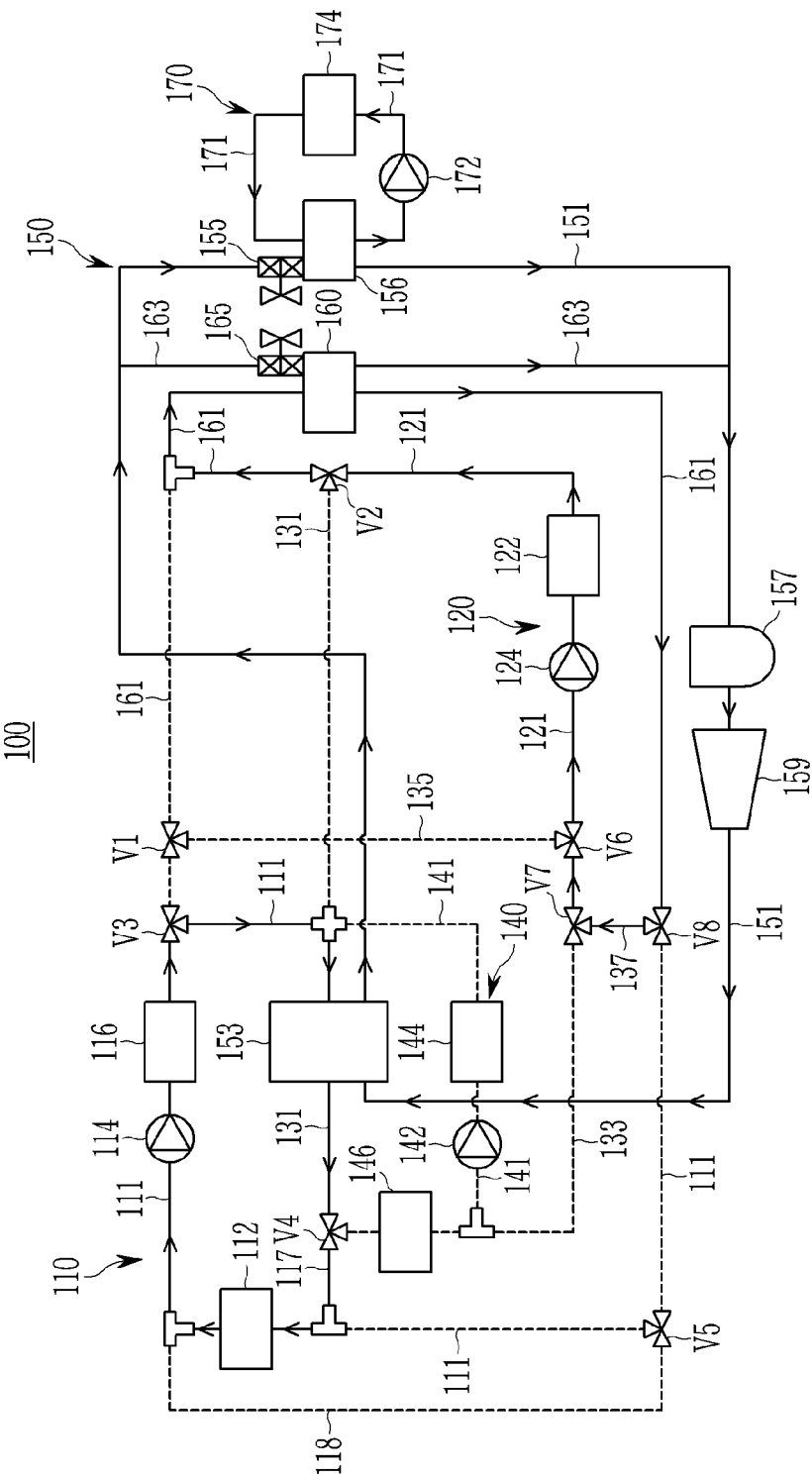
FIG. 2 is an operation state diagram when a battery module is cooled according to a cooling mode in the heat pump system for a vehicle according to the exemplary embodiment of the present disclosure.

FIG. 2 is an operation state diagram when a battery module is cooled according to a cooling mode in the heat pump system for a vehicle according to the exemplary embodiment of the present disclosure.

Referring to FIG. 2, when the battery module 122 is cooled in the cooling mode of the vehicle, in the electrical component cooling device 110, the coolant is circulated to the first line 111 by operation of the first water pump 114.

Here, the first line 111 connected to the first valve V1 may be closed and the first line 111 connected to the sixth line 131 may be opened, by operation of the third valve V3.

Furthermore, the sixth line 131 and the radiator connection line 117 are opened by operation of the fourth valve V4. In the instant case, the third line 141 may be closed by operation of the fourth valve V4.

Accordingly, the coolant may be circulated to the radiator 112, the electrical component 116, and the condenser 153 along the opened first line 111, a portion of the sixth line 131, and the radiator connection line 117.

That is, the coolant cooled in the radiator 112 may cool the electrical component 116 and exchange heat with the refrigerant supplied to the condenser 153.

In the battery cooling device 120, the coolant is circulated to the second line 121 by operation of the second water pump 124.

Here, the second line 121 and the fifth line 161 are connected by operation of the second valve V2. Furthermore, a portion of the sixth line 131 connected to the second valve V2 may be closed.

Furthermore, the first branch line 135 may be closed by operation of the first valve V1 and the sixth valve V6. The second branch line 137 may be opened by operation of the seventh valve V7 and the eighth valve V8.

Furthermore, the second line 121 connected to the second water pump 124 may be opened by operation of the sixth valve V6 and the seventh valve V7.

Accordingly, the coolant passing through the battery module 122 passes through the chiller 160 from the second line 121 along the fifth line 161. Accordingly, the coolant passing through the chiller 160 may be circulated along the opened second line 121, fifth line 161, and second branch line 137 while being introduced back into the second line 121 through the second branch line 137.

Here, in the CE device 150, each component may operate so that the refrigerant is circulated along the refrigerant line 151 to heat the interior of the vehicle.

In the instant case, the first and second expansion valves 155 and 165 may expand the refrigerant passing through the condenser 153 and supply the expanded refrigerant to the evaporator 156 and the chiller 160, respectively.

Accordingly, the coolant supplied through the fifth line 161 is cooled through heat exchange with the low-temperature refrigerant supplied to the chiller 160.

The cooled coolant may efficiently cool the battery module 122 while being circulated along the fifth line 161 and the opened second branch line 137 and second line 121.

Meanwhile, in the indoor cooling device 170, the fourth water pump 172 may operate so that the coolant is circulated along the fourth line 171 connecting the evaporator 156 and the cooler 174 to supply the coolant passing through the evaporator 156 to the cooler 174.

Here, the outdoor air introduced into the HVAC module is cooled while passing through the cooler 174 by the low-temperature coolant introduced into the cooler 174.

In the instant case, the opening/closing door closes a portion passing through the heater 144 so that the cooled outside air does not pass through the heater 144. Accordingly, the cooled outside air may be directly introduced into the interior of the vehicle.

Accordingly, the indoor cooling device 170 supplies the coolant whose temperature is lowered while being circulated on the fourth line 171 to the cooler 174 by operation of the fourth water pump 172 in the cooling mode of the vehicle, cooling the interior of the vehicle.

In the exemplary embodiment of the present disclosure, an operation of cooling the electrical component 116 and the battery module 122 using the coolant cooled in the radiator 112 in the cooling mode of the vehicle will be described with reference to FIG. 3.

Figure 3:
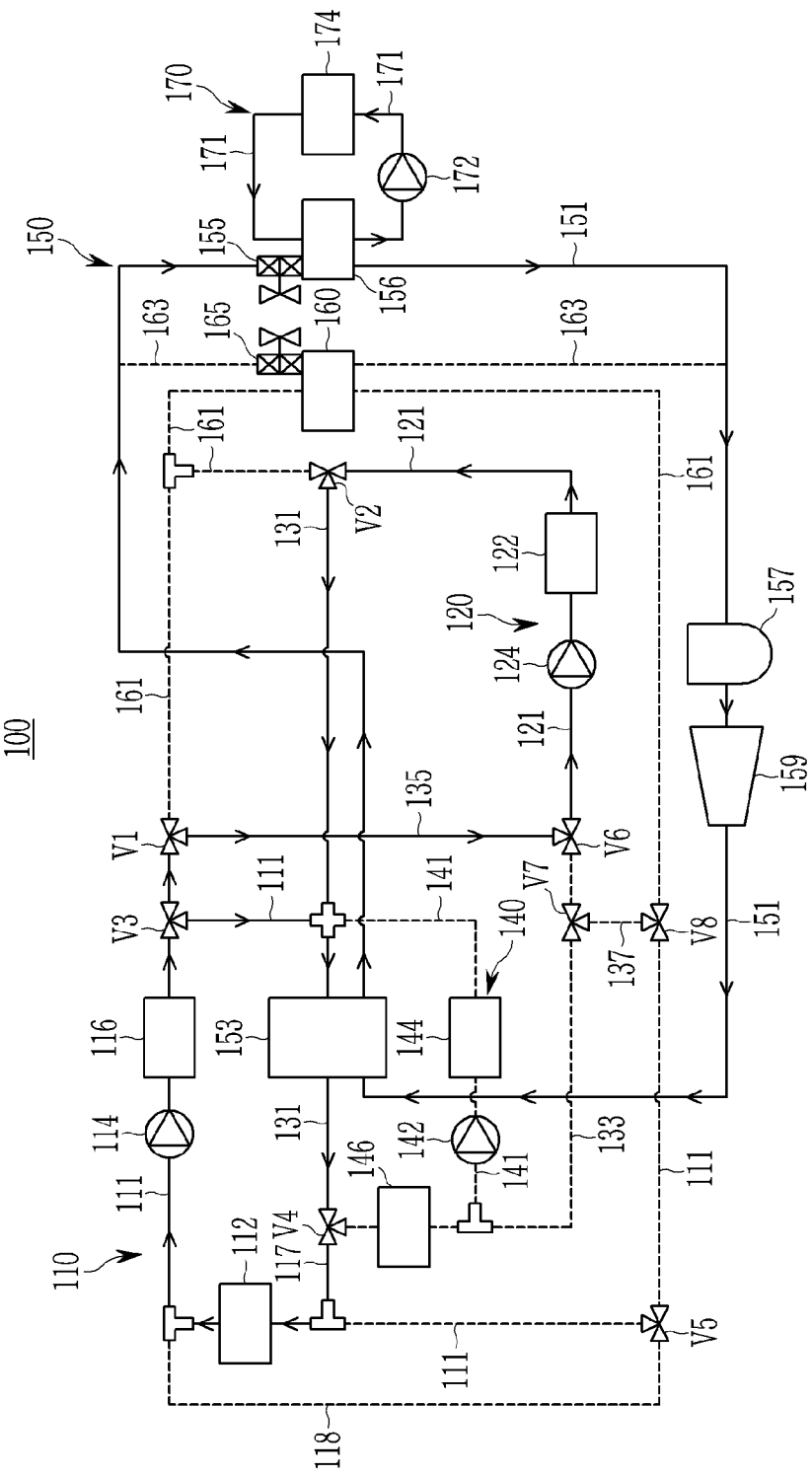
FIG. 3 is an operation state diagram for cooling an electrical component and a battery module using a coolant in a cooling mode in the heat pump system for a vehicle according to the exemplary embodiment of the present disclosure.

FIG. 3 is an operation state diagram for cooling an electrical component and a battery module using a coolant in a cooling mode in the heat pump system for a vehicle according to the exemplary embodiment of the present disclosure.

Referring to FIG. 3, the heat pump system 100 may cool the electrical component 116 and the battery module 122 using the coolant cooled in the radiator 112 in the cooling mode of the vehicle.

The first and second water pumps 114 and 124 operate in the electrical component cooling device 110 and the battery cooling device 120, respectively.

Here, the first line 111 connected to the first valve is opened by operation of the first valve V1 and the third valve V3. Furthermore, the fifth line 161 is closed and at the same time the first branch line 135 is opened, by operation of the first valve V1.

The second line 121 connected to the battery module 122 is opened and the supply line 133 is closed, by operation of the sixth valve V6. The sixth line 131 may be opened while the fifth line 161 is closed by operation of the second valve V2.

The radiator connection line 117 is connected to the first line 111 connected to the radiator 112 while the third line 141 is closed by operation of the fourth valve V4.

Accordingly, the coolant cooled in the radiator 112 may be introduced into the radiator 112 by sequentially passing through the electrical component 116, the battery module 122, and the condenser 153 along the opened first line 111, first branch line 135, second line 121, sixth line 131, and radiator connection line 117.

That is, the coolant cooled in the radiator 112 may cool the electrical component 116 and the battery module 122 while being circulated along the first line 111, the first branch line 135, and the second line 121.

Accordingly, the coolant may exchange heat with the refrigerant supplied to the condenser 153 while passing through the condenser 153 along the sixth line 131.

Here, in the CE device 150, each component may operate so that the refrigerant is circulated along the refrigerant line 151 to cool the interior of the vehicle.

In the instant case, the first expansion valve 155 expands the refrigerant passing through the condenser 153 and supplies the expanded refrigerant to the evaporator 156, and the second expansion valve 165 is not operated. Accordingly, the supply of the refrigerant to the chiller 160 is stopped.

Accordingly, in the electrical component 116 and the battery module 122, the coolant cooled in the radiator 112 may efficiently cool the electrical component 116 and the battery module 122 while being circulated along the first line 111 and the second line 121.

Meanwhile, in the indoor cooling device 170, the fourth water pump 172 may operate so that the coolant is circulated along the fourth line 171 connecting the evaporator 156 and the cooler 174 to supply the coolant passing through the evaporator 156 to the cooler 174.

Here, the outdoor air introduced into the HVAC module is cooled while passing through the cooler 174 by the low-temperature coolant introduced into the cooler 174.

In the instant case, the opening/closing door closes a portion passing through the heater 144 so that the cooled outside air does not pass through the heater 144. Accordingly, the cooled outside air may be directly introduced into the interior of the vehicle.

Accordingly, the indoor cooling device 170 supplies the coolant whose temperature is lowered while being circulated on the fourth line 171 to the cooler 174 by operation of the fourth water pump 172 in the cooling mode of the vehicle, cooling the interior of the vehicle.

In the exemplary embodiment of the present disclosure, an operation of recovering the external heat source during the heating mode of the vehicle and increasing the temperature of the battery module 122 will be described with reference to FIG. 4.

Figure 4:
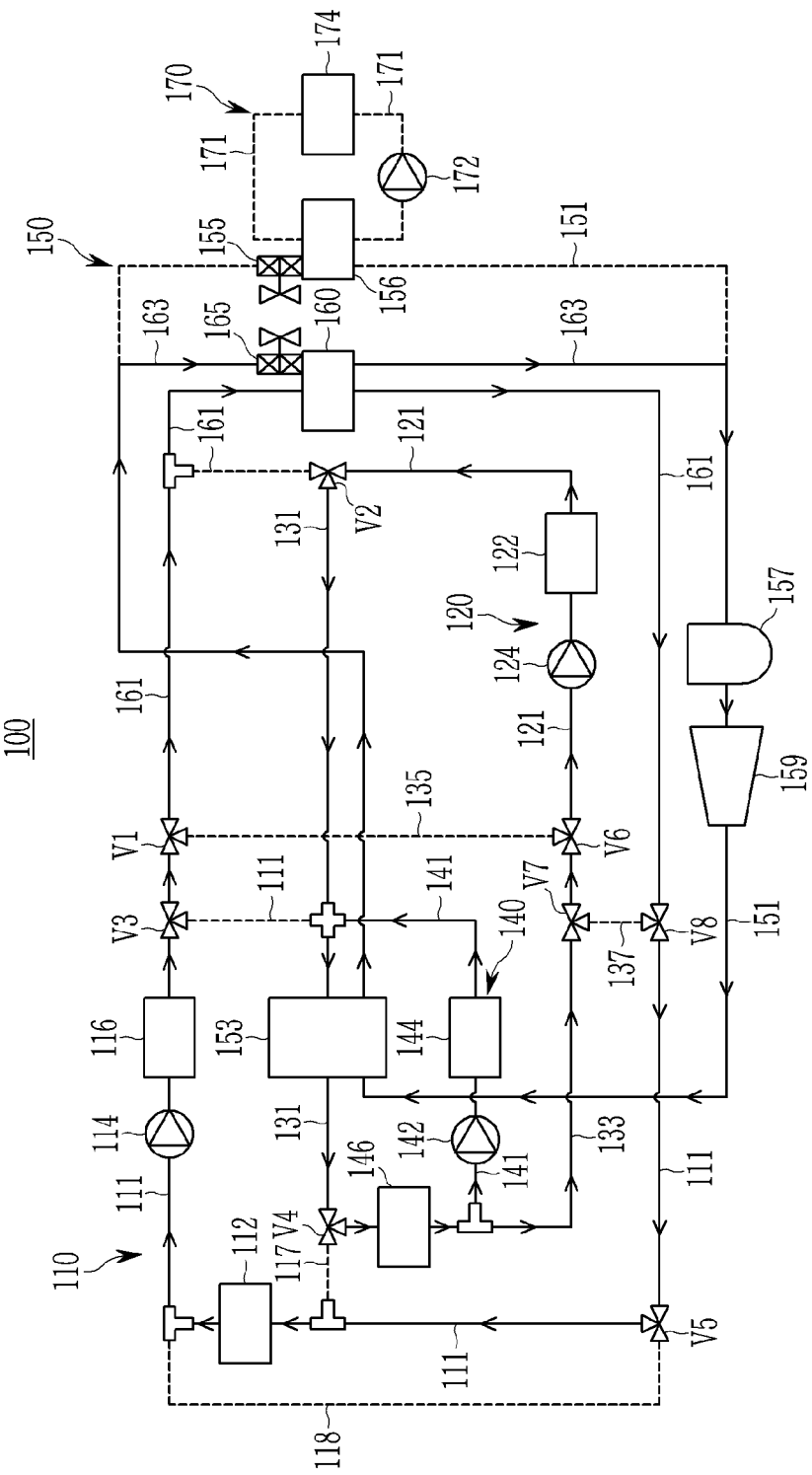
FIG. 4 is an operation state diagram for recovery of an external heat source and a temperature increase of the battery module according to a heating mode in the heat pump system for a vehicle according to the exemplary embodiment of the present disclosure.

FIG. 4 is an operation state diagram for recovery of an external heat source and a temperature increase of the battery module according to a heating mode in the heat pump system for a vehicle according to the exemplary embodiment of the present disclosure.

Referring to FIG. 4, the heat pump system 100 may recover the external heat source in the heating mode of the vehicle, use the external heat source for indoor heating, and increase the temperature of the battery module 122.

In the exemplary embodiment of the present disclosure, the first and second water pumps 114 and 124 operate in the electrical component cooling device 110 and the battery cooling device 120, respectively.

Furthermore, the third water pump 142 operates in the indoor heating device 140.

First, the first line 111 is connected to the fifth line 161 by operation of the first valve V1. At the same time, the first branch line 135 is closed.

Furthermore, the first line 111 connected to the first valve V1 is opened and a portion of the first line 111 connected to the sixth line 131 is closed, by operation of the third valve V3.

The first line 111 connected to the radiator 112 is opened while the bypass line 118 is closed by operation of the fifth valve V5.

Furthermore, the fifth line 161 may be connected to the first line 111 by operation of the eighth valve V8.

Accordingly, the coolant passing through the electrical component 116 may pass through the chiller 160 along the opened first line 111 and fifth line 161 and then recover the heat source from the outside air while passing through the radiator 112 along the first line 111 opened again.

Meanwhile, a portion of the fifth line 161 connected to the second valve V2 is closed by operation of the second valve V2, and the second line 121 is connected to the sixth line 131 by operation of the second valve V2.

Furthermore, the radiator connection line 117 is closed and at the same time the third line 141 is opened, by operation of the fourth valve V4.

The supply line 133 is connected to the second line 121 by operation of the sixth valve V6, and the second branch line 137 is closed by operation of the seventh valve V7.

Accordingly, the coolant passing through the battery module 122 passes through the condenser 153 along the opened second line 121 and sixth line 131 and is then supplied to the heater 144 along the opened third line 141.

Here, the coolant heater 146 operates when the temperature of the coolant circulated along the third line 141 is lower than a target temperature to heat the coolant circulated on the third line 141.

Meanwhile, the opening/closing door is opened so that the outside air introduced into the HVAC module and passing through the cooler 174 passes through the heater 144.

Accordingly, when the outside air introduced from the outside thereof passes through the cooler 174 to which the low-temperature coolant is not supplied, the outside air is introduced in a room temperature state in which the outside air is not cooled. The introduced external air is changed to a high temperature state while passing through the heater 144 and is then introduced into the interior of the vehicle so that heating of the interior of the vehicle may be implemented.

That is, the heat pump system 100 according to the exemplary embodiment of the present disclosure absorbs an external heat source from the radiator 112 and utilizes the heat source for indoor heating of the vehicle, reducing power consumption of the compressor 159 and improving heating efficiency.

Meanwhile, the coolant passing through the heater is introduced back into the condenser 153 along the third line 141 and the sixth line 131.

Some of the coolant passing through the condenser 153 may be circulated while being introduced into the battery module 122 along the opened supply line 133 and second line 121.

Accordingly, the coolant whose temperature increases while passing through the heater 144 and the condenser 153 is introduced into the battery module 122, increasing the temperature of the battery module 122.

Meanwhile, in the CE device 150, each component may operate so that the refrigerant is circulated along the refrigerant line 151 to heat the interior of the vehicle.

In the instant case, the first expansion valve 155 is not operated, and the second expansion valve 165 expands the refrigerant passing through the condenser 153 and supplies the expanded refrigerant to the chiller 160. Accordingly, the supply of the refrigerant to the evaporator 156 is stopped.

Here, when the dehumidification of the interior of the vehicle is required while the vehicle is in the heating mode, the first expansion valve 155 operates to supply the expanded refrigerant to the evaporator 156.

At the same time, in the indoor cooling device 170, the fourth water pump 172 operates, and the coolant is circulated along the fourth line 171.

The coolant circulated along the fourth line 171 may be introduced into the cooler 174 while being cooled through heat exchange with the refrigerant in the evaporator 156.

That is, the outside air introduced into the HVAC module is dehumidified while passing through the cooler 174 by the low-temperature coolant introduced into the cooler 174. Thereafter, the outside air is changed to the high temperature state while passing through the heater 144 and introduced into the interior of the vehicle, heating and dehumidifying the interior of the vehicle.

In the exemplary embodiment of the present disclosure, an operation of recovering the waste heat of the electrical component 116 in the heating mode of the vehicle and increasing the temperature of the battery module 122 will be described with reference to FIG. 5.

Figure 5:
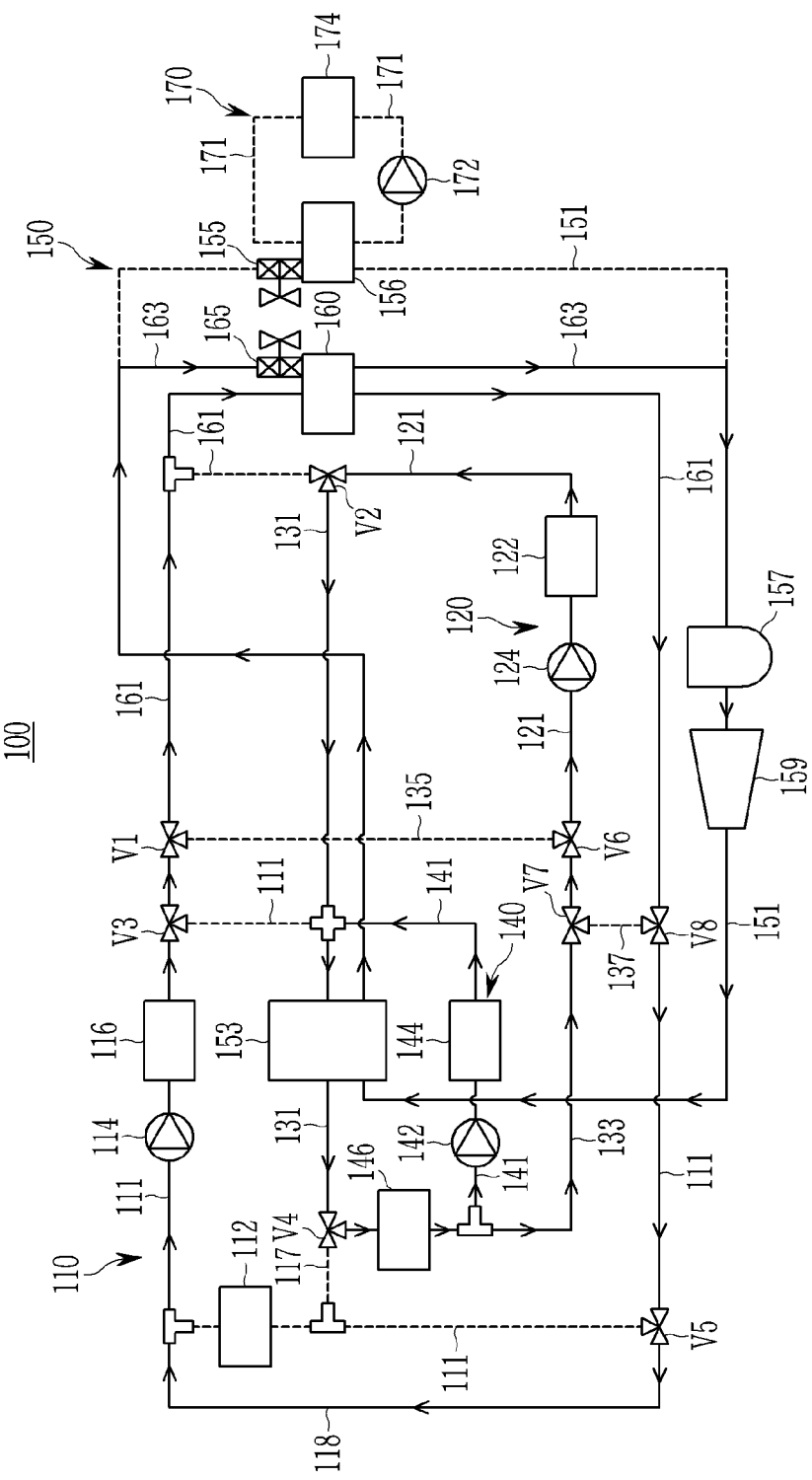
FIG. 5 is an operation state diagram for the recovery of waste heat of an electrical component and the temperature increase of the battery module according to the heating mode in the heat pump system for a vehicle according to the exemplary embodiment of the present disclosure.

FIG. 5 is an operation state diagram for the recovery of waste heat of an electrical component and the temperature increase of the battery module according to the heating mode in the heat pump system for a vehicle according to the exemplary embodiment of the present disclosure.

Referring to FIG. 5, the heat pump system 100 may recover the waste heat of the electrical component in the heating mode of the vehicle, recover the waste heat of the electrical component 116 for indoor heating, and increase the temperature of the battery module 122.

In the exemplary embodiment of the present disclosure, the first and second water pumps 114 and 124 operate in the electrical component cooling device 110 and the battery cooling device 120, respectively.

Furthermore, the third water pump 142 operates in the indoor heating device 140.

First, the first line 111 and the fifth line 161 are connected by operation of the first valve V1. At the same time, the first branch line 135 is closed.

Furthermore, the first line 111 connected to the first valve V1 is opened and a portion of the first line 111 connected to the sixth line 131 is closed, by operation of the third valve V3.

The bypass line 118 is opened while the first line 111 connected to the radiator is closed by operation of the fifth valve V5.

Furthermore, the fifth line 161 may be connected to the first line 111 by operation of the eighth valve V8.

Accordingly, the coolant passing through the electrical component 116 passes through the chiller 160 along the opened first line 111 and fifth line 161. Accordingly, the temperature of the coolant may increase by the waste heat of the electrical component 116 while the coolant passes through the electrical component 116 again without passing through the radiator 112 along the opened bypass line 118.

That is, in the electrical component cooling device 110, the temperature of the coolant increases by recovering the waste heat generated from the electrical component 116 while the coolant is circulated on the opened first line 111, the opened fifth line 161, and the bypass line 118.

The coolant having the increased temperature may be supplied to the chiller 160 connected to the fifth line 161. Accordingly, the waste heat generated from the electrical component 116 increases the temperature of the refrigerant supplied to the chiller 160.

That is, while repeatedly performing these operations, the coolant may absorb the waste heat from the electrical component 116, so that the temperature of the coolant may increase.

As the coolant whose temperature increases by absorbing the waste heat of the electrical component 116 passes through the chiller 160 through operation of the first water pump 114, the refrigerant supplied to the chiller 160 is recovered while the temperature of the refrigerant increases.

Accordingly, the chiller 160 may exchange heat between the coolant and the refrigerant to recover the waste heat from the coolant whose temperature increases while passing through the electrical component 116, increasing the temperature of the refrigerant.

That is, the chiller 160 may be supplied with the refrigerant expanded through operation of the second expansion valve 165 through the refrigerant connection line 163, and evaporate the supplied refrigerant by the heat exchange with the coolant whose temperature increases while the refrigerant passes through the electrical component 116, recovering the waste heat of the electrical component 116.

Meanwhile, a portion of the fifth line 161 connected to the second valve V2 is closed by operation of the second valve V2, and the second line 121 is connected to the sixth line 131 by operation of the second valve V2.

Furthermore, the radiator connection line 117 is closed and at the same time the third line 141 is opened, by operation of the fourth valve V4.

The supply line 133 is connected to the second line 121 by operation of the sixth valve V6, and the second branch line 137 is closed by operation of the seventh valve V7.

Accordingly, the coolant passing through the battery module 122 passes through the condenser 153 along the opened second line 121 and sixth line 131 and is then supplied to the heater 144 along the opened third line 141.

Here, the coolant heater 146 operates when the temperature of the coolant circulated along the third line 141 is lower than a target temperature to heat the coolant circulated on the third line 141.

Meanwhile, the opening/closing door is opened so that the outside air introduced into the HVAC module and passing through the cooler 174 passes through the heater 144.

Accordingly, when the outside air introduced from the outside passes through the cooler 174 to which the low-temperature coolant is not supplied, the outside air is introduced in a room temperature state in which the outside air is not cooled. The introduced external air is changed to a high temperature state while passing through the heater 144 and is then introduced into the interior of the vehicle so that heating of the interior of the vehicle may be implemented.

That is, the heat pump system 100 according to the exemplary embodiment of the present disclosure may absorb the waste heat from the electrical component 116 and use the heat source for indoor heating of the vehicle, reducing power consumption of the compressor 159 and improving heating efficiency.

Meanwhile, the coolant passing through the heater 144 is introduced back into the condenser 153 along the third line 141 and the sixth line 131.

Some of the coolant passing through the condenser 153 may be circulated while being introduced into the battery module 122 along the opened supply line 133 and second line 121.

Accordingly, the coolant whose temperature increases while passing through the heater 144 and the condenser 153 is introduced into the battery module 122, increasing the temperature of the battery module 122.

Meanwhile, in the CE device 150, each component may operate so that the refrigerant is circulated along the refrigerant line 151 to heat the interior of the vehicle.

In the instant case, the first expansion valve 155 is not operated, and the second expansion valve 165 expands the refrigerant passing through the condenser 153 and supplies the expanded refrigerant to the chiller 160. Accordingly, the supply of the refrigerant to the evaporator 156 is stopped.

Here, when the dehumidification of the interior of the vehicle is required while the vehicle is in the heating mode, the first expansion valve 155 operates to supply the expanded refrigerant to the evaporator 156.

At the same time, in the indoor cooling device 170, the fourth water pump 172 operates, and the coolant is circulated along the fourth line 171.

The coolant circulated along the fourth line 171 may be introduced into the cooler 174 while being cooled through heat exchange with the refrigerant in the evaporator 156.

That is, the outside air introduced into the HVAC module is dehumidified while passing through the cooler 174 by the low-temperature coolant introduced into the cooler 174. Thereafter, the outside air is changed to the high temperature state while passing through the heater 144 and introduced into the interior of the vehicle, heating and dehumidifying the interior of the vehicle.

In the exemplary embodiment of the present disclosure, an operation of recovering the waste heat of the external heat source and the battery module 122 in the heating mode of the vehicle will be described with reference to FIG. 6.

Figure 6:
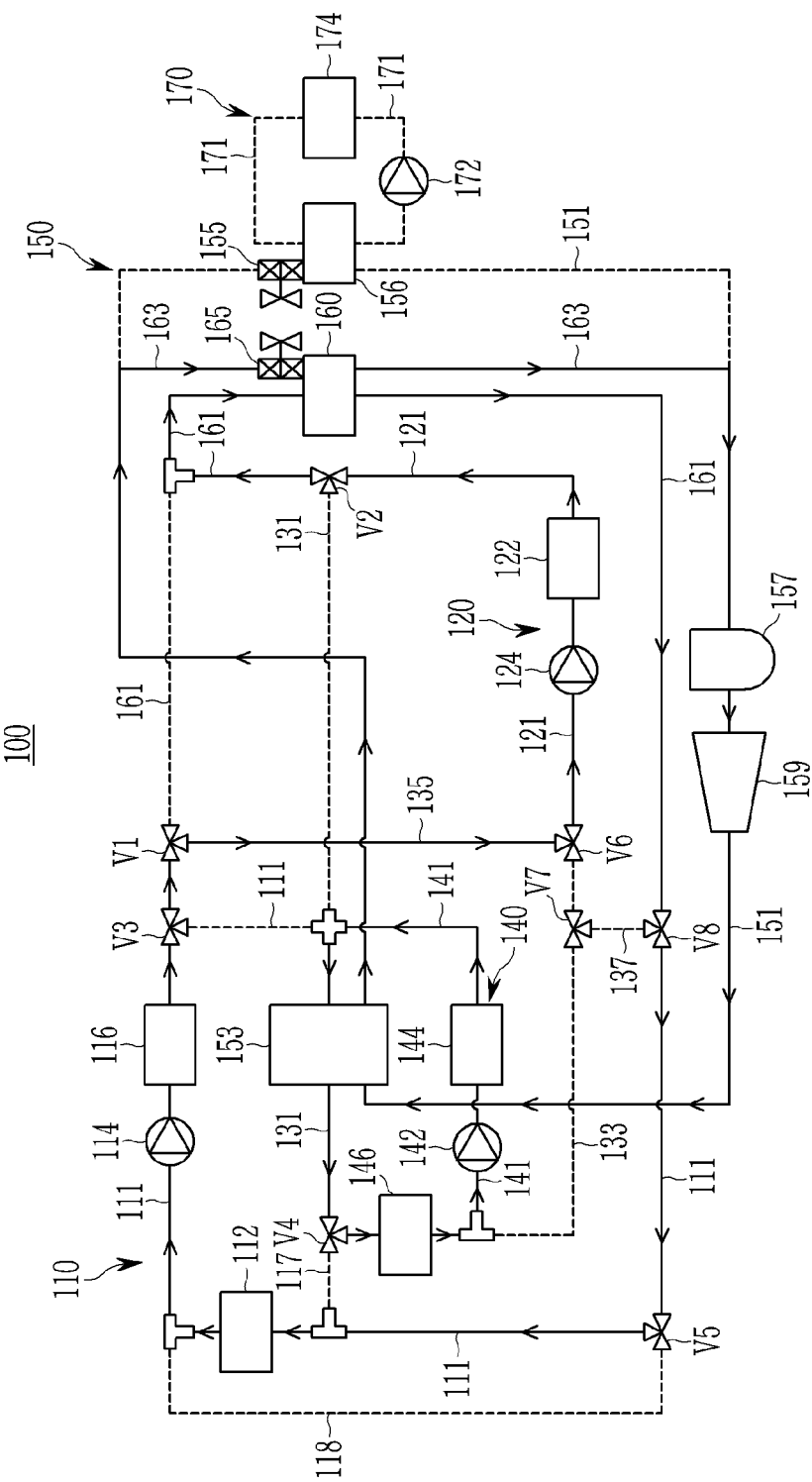
FIG. 6 is an operation state diagram for recovery of waste heat of the external heat source and the battery module according to a heating mode in the heat pump system for a vehicle according to the exemplary embodiment of the present disclosure.

FIG. 6 is an operation state diagram for recovery of waste heat of the external heat source and the battery module according to a heating mode in the heat pump system for a vehicle according to the exemplary embodiment of the present disclosure.

Referring to FIG. 6, the heat pump system 100 may recover the waste heat of the external heat source and the battery module 122 in the heating mode of the vehicle, and use the external heat source and the waste heat for indoor heating.

In the exemplary embodiment of the present disclosure, the first and second water pumps 114 and 124 operate in the electrical component cooling device 110 and the battery cooling device 120, respectively.

Furthermore, the third water pump 142 operates in the indoor heating device 140.

First, the fifth line 161 connected to the first line 111 is closed by operation of the first valve V1. At the same time, the first branch line 135 is opened.

The second line 121 is connected to the fifth line 161 by operation of the second valve V2. Furthermore, a portion of the sixth line 131 connected to the second line 121 is closed by operation of the second valve V2.

The first line 111 connected to the radiator 112 is opened while the bypass line 118 is closed by operation of the fifth valve V5.

Here, the first branch line 135 is connected to the second line 121 by operation of the sixth valve V6. Furthermore, the supply line 133 and the second branch line 137 are closed by operation of the seventh valve V7.

Furthermore, the fifth line 161 is connected to the first line 111 by operation of the eighth valve V8.

Accordingly, the coolant passing through the electrical component 116 may sequentially pass through the battery module 122 and the chiller 160 along the opened first line 111, first branch line 135, second line 121, and fifth line 161.

Accordingly, the coolant passing through the chiller 160 may recover a heat source from outside air while passing through the radiator 112 along the first line 111 opened again.

That is, the coolant may recover the external heat source from the radiator 112 and at the same time absorb the waste heat of the battery module 122 while being circulated along the first line 111, the first branch line 135, the second line 121, the second line 121, and the fifth line 161 that are opened by the first and second water pumps 114 and 124, and thus, the temperature of the coolant may increase.

As the coolant whose temperature increases by absorbing the waste heat of the external heat source and the battery module 122 passes through the chiller 160 by operation of the first and second water pumps 114 and 124, the refrigerant supplied to the chiller 160 is recovered while the temperature of the refrigerant increases.

Accordingly, the chiller 160 may exchange heat between the coolant and the refrigerant to recover the waste heat from the coolant whose temperature increases, increasing the temperature of the refrigerant.

That is, the chiller 160 may be supplied with the refrigerant expanded by operation of the second expansion valve 165 through the refrigerant connection line 163, and evaporate the supplied refrigerant by exchanging heat with the coolant whose temperature increases by recovering the waste heat of the external heat source and the battery module 122, recovering the external heat source and the waste heat of the battery module 122.

Meanwhile, in the exemplary embodiment of the present disclosure, the third line 141 may be opened while the radiator connection line 117 may be closed by operation of the fourth valve V4.

Accordingly, the coolant passing through the condenser 153 along the opened sixth line 131 may be supplied to the heater 144 along the third line 141.

Here, the coolant heater 146 operates when the temperature of the coolant circulated along the third line 141 is lower than a target temperature to heat the coolant circulated on the third line 141.

Meanwhile, the opening/closing door is opened so that the outside air introduced into the HVAC module and passing through the cooler 174 passes through the heater 144.

Accordingly, when the outside air introduced from the outside passes through the cooler 174 to which the low-temperature coolant is not supplied, the outside air is introduced in a room temperature state in which the outside air is not cooled. The introduced external air is changed to a high temperature state while passing through the heater 144 and is then introduced into the interior of the vehicle so that heating of the interior of the vehicle may be implemented.

That is, the heat pump system 100 according to the exemplary embodiment of the present disclosure may absorb the waste heat generated from the external heat source and the battery module 122, and use the heat source for indoor heating of the vehicle, reducing power consumption of the compressor 159 and improving heating efficiency.

Furthermore, the coolant passing through the heater 144 passes through the condenser 153 along the sixth line 131 connected to the third line 141, and then is circulated along the third line 141 and the sixth line 131 while being discharged back to the third line 141.

By repeatedly performing these operations, it is possible to heat the interior of the vehicle.

Meanwhile, in the CE device 150, each component may operate so that the refrigerant is circulated along the refrigerant line 151 to heat the interior of the vehicle.

In the instant case, the first expansion valve 155 is not operated, and the second expansion valve 165 expands the refrigerant passing through the condenser 153 and supplies the expanded refrigerant to the chiller 160. Accordingly, the supply of the refrigerant to the evaporator 156 is stopped.

Here, when the dehumidification of the interior of the vehicle is required while the vehicle is in the heating mode, the first expansion valve 155 operates to supply the expanded refrigerant to the evaporator 156.

At the same time, in the indoor cooling device 170, the fourth water pump 172 operates, and the coolant is circulated along the fourth line 171.

The coolant circulated along the fourth line 171 may be introduced into the cooler 174 while being cooled through heat exchange with the refrigerant in the evaporator 156.

That is, the outside air introduced into the HVAC module is dehumidified while passing through the cooler 174 by the low-temperature coolant introduced into the cooler 174. Thereafter, the outside air is changed to the high temperature state while passing through the heater 144 and introduced into the interior of the vehicle, heating and dehumidifying the interior of the vehicle.

Furthermore, an operation of recovering the waste heat of the electrical component 116 and the battery module 122 in the heating mode of the vehicle will be described with reference to FIG. 7.

Figure 7:
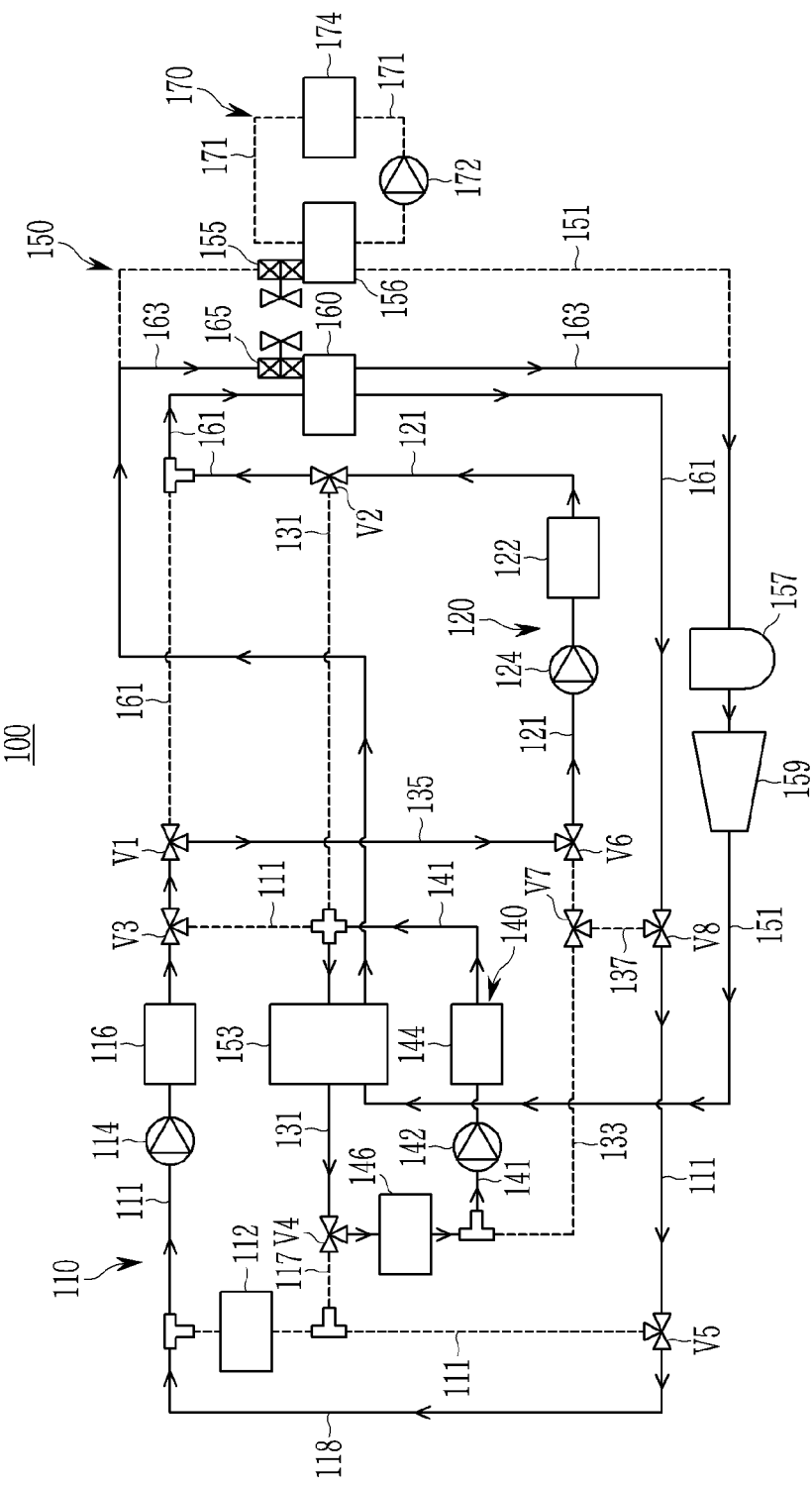
FIG. 7 is an operation state diagram for recovery of the waste heat of the electrical component and the battery module according to the heating mode in the heat pump system for a vehicle according to the exemplary embodiment of the present disclosure.

FIG. 7 is an operation state diagram for recovery of the waste heat of the electrical component and the battery module according to the heating mode in the heat pump system for a vehicle according to the exemplary embodiment of the present disclosure.

Referring to FIG. 7, the heat pump system 100 may recover the waste heat of the electrical component 116 and the battery module 122 in the heating mode of the vehicle, and use the waste heat for indoor heating.

In the exemplary embodiment of the present disclosure, the first and second water pumps 114 and 124 operate in the electrical component cooling device 110 and the battery cooling device 120, respectively.

Furthermore, the third water pump 142 operates in the indoor heating device 140.

First, the fifth line 161 connected to the first line 111 is closed by operation of the first valve V1. At the same time, the first branch line 135 is opened.

The second line 121 is connected to the fifth line 161 by operation of the second valve V2. Furthermore, a portion of the sixth line 131 connected to the second line 121 is closed by operation of the second valve V2.

The bypass line 118 is opened while the first line 111 connected to the radiator is closed by operation of the fifth valve V5.

Here, the first branch line 135 is connected to the second line 121 by operation of the sixth valve V6. Furthermore, the supply line 133 and the second branch line 137 are closed by operation of the seventh valve V7.

Furthermore, the fifth line 161 may be connected to the first line 111 by operation of the eighth valve V8.

Accordingly, the coolant passing through the electrical component 116 may sequentially pass through the battery module 122 and the chiller 160 along the opened first line 111, first branch line 135, second line 121, and fifth line 161.

Accordingly, the temperature of the coolant passing through the chiller 160 may increase by the waste heat of the electrical component 116 and the battery module 122 while the coolant passes through the electrical component 116 again without passing through the radiator 112 along the opened bypass line 118.

That is, in the electrical component cooling device 110 and the battery cooling device 120, the coolant may recover the waste heat generated from the electrical component 116 and the battery module 122 while being circulated to the opened first line 111, first branch line 135, second line 121, and the opened fifth line 161 and bypass line 118, so that the temperature of the coolant may increase.

The coolant having the increased temperature may be supplied to the chiller 160 connected to the fifth line 161. Accordingly, the waste heat generated from the electrical component 116 and the battery module 122 increases the temperature of the coolant supplied to the chiller 160.

That is, by repeatedly performing these operations, the coolant may absorb the waste heat generated from the electrical component 116 and the battery module 122, so that the temperature of the coolant may increase.

As the coolant whose temperature increases by absorbing the waste heat of the electrical component 116 and the battery module 122 passes through the chiller 160 by operation of the first and second water pumps 114 and 124, the coolant is recovered while increasing the temperature of the refrigerant supplied to the chiller 160.

Accordingly, the chiller 160 may exchange heat between the coolant and the refrigerant to recover the waste heat from the coolant whose temperature increases while passing through the electrical component 116 and the battery module 122, increasing the temperature of the refrigerant.

That is, the chiller 160 may be supplied with the refrigerant expanded through operation of the second expansion valve 165 through the refrigerant connection line 163, and evaporate the supplied refrigerant by the heat exchange with the coolant whose temperature increases while the refrigerant passes through the electrical component 116, recovering the waste heat of the electrical component 116 and the battery module 122.

Meanwhile, in the exemplary embodiment of the present disclosure, the third line 141 may be opened while the radiator connection line 117 may be closed by operation of the fourth valve V4.

Accordingly, the coolant passing through the condenser 153 along the opened sixth line 131 may be supplied to the heater 144 along the third line 141.

Here, the coolant heater 146 operates when the temperature of the coolant circulated along the third line 141 is lower than a target temperature to heat the coolant circulated on the third line 141.

Meanwhile, the opening/closing door is opened so that the outside air introduced into the HVAC module and passing through the cooler 174 passes through the heater 144.

Accordingly, when the outside air introduced from the outside passes through the cooler 174 to which the low-temperature coolant is not supplied, the outside air is introduced in a room temperature state in which the outside air is not cooled. The introduced external air is changed to a high temperature state while passing through the heater 144 and is then introduced into the interior of the vehicle so that heating of the interior of the vehicle may be implemented.

That is, the heat pump system 100 according to the exemplary embodiment of the present disclosure may absorb the waste heat generated from the electrical component 116 and the battery module 122 and use the heat source for indoor heating of the vehicle, reducing power consumption of the compressor 159 and improving heating efficiency.

Furthermore, the coolant passing through the heater 144 passes through the condenser 153 along the sixth line 131 connected to the third line 141, and then is circulated along the third line 141 and the sixth line 131 while being discharged back to the third line 141.

By repeatedly performing these operations, it is possible to heat the interior of the vehicle.

Meanwhile, in the CE device 150, each component may operate so that the refrigerant is circulated along the refrigerant line 151 to heat the interior of the vehicle.

In the instant case, the first expansion valve 155 is not operated, and the second expansion valve 165 expands the refrigerant passing through the condenser 153 and supplies the expanded refrigerant to the chiller 160. Accordingly, the supply of the refrigerant to the evaporator 156 is stopped.

Here, when the dehumidification of the interior of the vehicle is required while the vehicle is in the heating mode, the first expansion valve 155 operates to supply the expanded refrigerant to the evaporator 156.

At the same time, in the indoor cooling device 170, the fourth water pump 172 operates, and the coolant is circulated along the fourth line 171.

The coolant circulated along the fourth line 171 may be introduced into the cooler 174 while being cooled through heat exchange with the refrigerant in the evaporator 156.

That is, the outside air introduced into the HVAC module is dehumidified while passing through the cooler 174 by the low-temperature coolant introduced into the cooler 174. Thereafter, the outside air is changed to the high temperature state while passing through the heater 144 and introduced into the interior of the vehicle, heating and dehumidifying the interior of the vehicle.

Accordingly, as described above, according to the heat pump system 100 for a vehicle according to various exemplary embodiments of the present disclosure, it is possible to simplify the system by use of the chiller 160 in which the coolant and the refrigerant exchange heat with each other in the electric vehicle to control the temperature of the battery module 122 according to the mode of the vehicle.

Furthermore, according to various exemplary embodiments of the present disclosure, it is possible to improve heating efficiency by selectively recovering the waste heat generated from the external heat source, the electrical component 116, or the battery module 122 in the heating mode of the vehicle and using the recovered waste heat for indoor heating.

Furthermore, according to various exemplary embodiments of the present disclosure, it is possible to simplify the system and simplify the layout of the connection pipe through which the refrigerant is circulated by selectively exchanging heat between the thermal energy generated from the refrigerant and the coolant during the condensation and evaporation of the refrigerant, and controlling the indoor temperature of the vehicle using the heat-exchanged low-temperature or high-temperature coolant, respectively.

Furthermore, according to various exemplary embodiments of the present disclosure, it is possible to increase the entire travel distance of the vehicle by efficiently regulating the temperature of the battery module 122 to exhibit the optimal performance of the battery module 122 and effectively managing the battery module 122 to increase the entire travel distance of the vehicle.

Furthermore, according to various exemplary embodiments of the present disclosure, it is possible to modularize the centralized energy device 150 that generates the thermal energy through the condensation and evaporation of the refrigerant, and reduce the size and weight and prevent the occurrence of noise, vibration, and operational instability compared to the conventional air conditioner means by use of the high-performance refrigerant.

Furthermore, according to various exemplary embodiments of the present disclosure, it is possible to reduce the cost and weight by use of the coolant heater 146 applied to the indoor heating device 140 for assisting the indoor heating.

Furthermore, according to various exemplary embodiments of the present disclosure, it is possible to reduce the manufacturing cost, reduce the weight, and improve the space utilization by simplifying the entire system.

In various exemplary embodiments of the present disclosure, a controller is connected to at least one of the elements of the heat pump system 100 such as valves V1 to V8 but not limited thereto, to control the operations thereof.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A heat pump system for a vehicle, the heat pump system comprising:
   an electrical component cooling device that includes a radiator and a first pump provided on a first line and configured to circulate a coolant to the first line to cool at least one electrical component provided on the first line;
   a battery cooling device that includes a second pump and a battery module provided on a second line, and configured to circulate the coolant to the battery module;
   an indoor heating device that includes a third pump and a heater provided on a third line to heat an interior of the vehicle using a high-temperature coolant;
   an indoor cooling device that includes a fourth pump and a cooler interconnected through a fourth line to cool the interior of the vehicle using a low-temperature coolant;
   a centralized energy (CE) device that is configured to regulate a temperature of the coolant by exchanging heat between thermal energy generated during condensation and evaporation of a refrigerant circulated on a refrigerant line and the introduced coolant to supply the high-temperature coolant to the indoor heating device and supply the low-temperature coolant to the indoor cooling device; and
   a chiller which is connected to a refrigerant connection line connected to the refrigerant line, is provided on a fifth line connected to the first line and the second line through first and second valves, respectively, and is configured to control the temperature of the coolant by heat-exchanging a selectively introduced coolant with the refrigerant,
   wherein the centralized energy device includes:
      a condenser that condenses the refrigerant by exchanging heat between the refrigerant and the coolant;
      a first expansion valve which is connected to the condenser and the refrigerant line;
      an evaporator which is connected to the first expansion valve through the refrigerant line, connected to the fourth line, and is configured to lower the temperature of the coolant while evaporating the refrigerant through heat exchange between the refrigerant and the coolant;
      a compressor which is provided on the refrigerant line between the evaporator and the condenser; and
      an accumulator which is provided on the refrigerant line between the evaporator and the compressor,
   wherein a first end portion of the refrigerant connection line is connected to the refrigerant line between the condenser and the first expansion valve, and
   wherein a second end portion of the refrigerant connection line is connected to the refrigerant line between the evaporator and the accumulator,
   wherein the condenser is provided on a sixth line whose a first end portion thereof is connected to the second valve,
   wherein the first line is connected to the sixth line through a third valve provided on the first line between the at least one electrical component and the first valve,
   wherein a first end portion of the third line is connected to a fourth valve provided on the sixth line,
   wherein a second end portion of the third line is connected to the sixth line, and wherein the first line connected to the radiator is connected to the fourth valve through a radiator connection line.

2. The heat pump system of claim 1, further including:
a bypass line that selectively connects the first line connected to the first pump to a fifth valve provided on the first line at a front of the radiator based on a flow direction of the coolant so that the coolant passing through the at least one electrical component is circulated back to the at least one electrical component by bypassing the radiator;
a supply line that has a first end portion connected to the third line and a second end portion connected to the second line through a sixth valve;
a seventh valve which is provided on the supply line;
an eighth valve that selectively connects the fifth line connected to a rear end portion of the chiller and the first line based on the flow direction of the coolant;
a first branch line that connects the first valve and the sixth valve; and
a second branch line that connects the seventh valve and the eighth valve.

3. The heat pump system of claim 2, wherein
when cooling the battery module in a cooling mode of the vehicle,
in the electrical component cooling device, the first pump operates,
the first line connected to the first valve is closed and the first line connected to the sixth line is opened, by operation of the third valve,
the sixth line and the radiator connection line are connected by operation of the fourth valve,
the coolant is circulated to the radiator, the at least one electrical component, and the condenser along the open first line, a portion of the sixth line, and the radiator connection line,
in the battery cooling device, the second pump operates,
the second line and the fifth line are connected and a portion of the sixth line connected to the second valve is closed, by operation of the second valve,
the first branch line is closed by operation of the first valve and the sixth valve,
the second branch line is opened by operation of the seventh valve and the eighth valve,
the second line connected to the second pump is opened by operation of the sixth valve and the seventh valve,
the coolant passing through the battery module passes through the chiller along the fifth line from the second line, and then is circulated along the opened second line, fifth line, and second branch line while being introduced back into the second line through the second branch line,
in the centralized energy device, each component operates to circulate the refrigerant along the refrigerant line, and
in the indoor cooling device, the fourth pump operates so that the coolant is circulated along the fourth line connecting the evaporator and the cooler to supply the coolant passing through the evaporator provided in the centralized energy device to the cooler.

4. The heat pump system of claim 2, wherein
when cooling the at least one electrical component and the battery module using the coolant cooled in the radiator in the cooling mode of the vehicle,
in the electrical component cooling device and the battery cooling device, the first and second pumps operate, respectively, the first line connected to the first valve is opened by operation of the first valve and the third valve,
the first branch line is opened while the fifth line is closed by operation of the first valve,
the second line connected to the battery module is opened and the supply line is closed, by operation of the sixth valve,
the sixth line is opened while the fifth line is closed by operation of the second valve,
the radiator connection line is connected to the first line connected to the radiator while the third line is closed by operation of the fourth valve,
the coolant cooled in the radiator is introduced into the radiator by sequentially passing through the at least one electrical component, the battery module, and the condenser along the opened first line, first branch line, second line, sixth line, and radiator connection line,
in the centralized energy device, each component operates to circulate the refrigerant along the refrigerant line, and
in the indoor cooling device, the fourth pump operates so that the coolant is circulated along the fourth line connecting the evaporator and the cooler to supply the coolant passing through the evaporator provided in the centralized energy device to the cooler.

5. The heat pump system of claim 2, wherein
when recovering an external heat source and increasing a temperature of the battery module in a heating mode of the vehicle,
in the electrical component cooling device and the battery cooling device, the first and second pumps operate, respectively,
the third pump operates in the indoor heating device,
the first line is connected to the fifth line and the first branch line is closed, by operation of the first valve,
the first line connected to the first valve is opened and a portion of the first line connected to the sixth line is closed, by operation of the third valve,
the first line connected to the radiator is opened while the bypass line is closed by operation of the fifth valve,
the fifth line is connected to the first line by operation of the eighth valve,
the coolant passing through the at least one electrical component passes through the chiller along the opened first line and the fifth line, and then recovers a heat source from outside air while passing through the radiator along the first line opened again,
the fifth line connected to the second valve is closed and the second line is connected to the sixth line through the second valve, by operation of the second valve,
the third line is opened while the radiator connection line is closed by operation of the fourth valve,
the supply line and the second line are connected by operation of the sixth valve,
the second branch line is closed by operation of the seventh valve,
the coolant passing through the battery module passes through the condenser along the opened second line and sixth line, and then is supplied to the heater along the opened third line,
the coolant passing through the heater is introduced back into the condenser along the third line and the sixth line,
some of the coolant passing through the condenser is circulated while being introduced back into the battery module along the opened supply line and second line, and in the centralized energy device, each component operates so that the refrigerant is circulated along the refrigerant line.

6. The heat pump system of claim 2, wherein
when recovering waste heat of the at least one electrical component and increasing a temperature of the battery module in a heating mode of the vehicle,
in the electrical component cooling device and the battery cooling device, the first and second pumps operate, respectively,
the third pump operates in the indoor heating device,
the first line is connected to the fifth line and the first branch line is closed, by operation of the first valve,
the first line connected to the first valve is opened and a portion of the first line connected to the sixth line is closed, by operation of the third valve,
the bypass line is opened while the first line connected to the radiator is closed by operation of the fifth valve,
the fifth line is connected to the first line by operation of the eighth valve,
as the coolant passing through the at least one electrical component passes through the chiller along the opened first line and fifth line, and then passes through the at least one electrical component along the opened bypass line without passing through the radiator, the temperature of the coolant increases by the waste heat of the at least one electrical component,
the fifth line connected to the second valve is closed and the second line is connected to the sixth line through the second valve, by operation of the second valve,
the third line is opened while the radiator connection line is closed by operation of the fourth valve,
the supply line and the second line are connected by operation of the sixth valve,
the second branch line is closed by operation of the seventh valve,
the coolant passing through the battery module passes through the condenser along the opened second line and sixth line, and then is supplied to the heater along the opened third line,
the coolant passing through the heater is introduced back into the condenser along the third line and the sixth line,
some of the coolant passing through the condenser is circulated while being introduced back into the battery module along the opened supply line and second line, and
in the centralized energy device, each component operates so that the refrigerant is circulated along the refrigerant line.

7. The heat pump system of claim 6, wherein the chiller heats the coolant and the refrigerant to recover the waste heat from the coolant whose temperature increases while passing through the at least one electrical component to increase a temperature of the refrigerant.

8. The heat pump system of claim 2, wherein
when recovering an external heat source and recovering waste heat of the battery module in a heating mode of the vehicle,
in the electrical component cooling device and the battery cooling device, the first and second pumps operate, respectively,
the third pump operates in the indoor heating device,
the fifth line connected to the first line is closed and the first branch line is opened, by operation of the first valve,
the second line is connected to the fifth line and a portion of the sixth line connected to the second line is closed, by operation of the second valve,
the first line connected to the radiator is opened while the bypass line is closed by operation of the fifth valve,
the first branch line is connected to the second line by operation of the sixth valve,
the supply line and the second branch line are closed by operation of the seventh valve,
the fifth line is connected to the first line by operation of the eighth valve,
as the coolant passing through the at least one electrical component sequentially passes through the battery module and the chiller along the opened first line, first branch line, second line, and the fifth line and then passes through the radiator along the first line opened again, a heat source is recovered from outside air,
the third line is opened while the radiator connection line is closed by operation of the fourth valve,
the coolant passing through the condenser along the opened sixth line is supplied to the heater along the third line,
the coolant passing through the heater is circulated while being introduced back into the condenser along the third line and the opened sixth line, and
in the centralized energy device, each component operates so that the refrigerant is circulated along the refrigerant line.

9. The heat pump system of claim 2, wherein
when waste heat of the at least one electrical component and the battery module is recovered in a heating mode of the vehicle,
in the electrical component cooling device and the battery cooling device, the first and second pumps operate, respectively,
the third pump operates in the indoor heating device,
the fifth line connected to the first line is closed, and the first branch line is opened, by operation of the first valve,
the second line is connected to the fifth line and a portion of the sixth line connected to the second line is closed, by operation of the second valve,
the bypass line is opened while the first line connected to the radiator is closed by operation of the fifth valve,
the first branch line is connected to the second line by operation of the sixth valve,
the supply line and the second branch line are closed by operation of the seventh valve,
the fifth line is connected to the first line by operation of the eighth valve,
as the coolant passing through the at least one electrical component passes through the chiller along the opened first line, first branch line, second line, and fifth line, and then passes through the at least one electrical component and the battery module along the opened bypass line without passing through the radiator, the temperature of the coolant increases by waste heat of the at least one electrical component and the battery module,
the third line is opened while the radiator connection line is closed by operation of the fourth valve,
the coolant passing through the condenser along the opened sixth line is supplied to the heater along the third line,
the coolant passing through the heater is circulated while being introduced back into the condenser along the third line and the opened sixth line, and in the centralized energy device, each component operates so that the refrigerant is circulated along the refrigerant line.

10. The heat pump system of claim 1, wherein at a front end portion of the chiller, the refrigerant connection line is provided with a second expansion valve to control a flow of the refrigerant introduced into the chiller and selectively expand the refrigerant.

11. The heat pump system of claim 10, wherein the second expansion valve expands the refrigerant introduced into the refrigerant connection line and introduces the refrigerant into the chiller, when the battery module is cooled using the coolant heat-exchanged with the refrigerant, or when waste heat is selectively recovered from the at least one electrical component and the battery module.

12. The heat pump system of claim 10, wherein the first expansion valve and the second expansion valve are each an electronic expansion valve that selectively expands the refrigerant while controlling the flow of the refrigerant.

13. The heat pump system of claim 1, wherein when dehumidification is required in a heating mode of the vehicle, the fourth pump provided in the indoor cooling device operates, and the refrigerant is supplied to the evaporator provided in the centralized energy device.

14. The heat pump system of claim 1, wherein the indoor heating device further includes a coolant heater provided on the third line between the third valve and the third pump.

15. The heat pump system of claim 1, wherein the indoor heating device further includes an air heater provided at a rear of the heater toward an interior of the vehicle to selectively heat an outside air passing through the heater.

16. The heat pump system of claim 14, wherein in a heating mode of the vehicle, the coolant heater operates when the temperature of the coolant supplied to the heater is lower than a target temperature or when a temperature of the battery module increases.

17. The heat pump system of claim 1, wherein the chiller recovers waste heat generated from the at least one electrical component or the battery module or regulates a temperature of the battery module according to a cooling mode or a heating mode of the vehicle.

* * * * *